US010691280B1

(12) United States Patent
Ding et al.

(10) Patent No.: US 10,691,280 B1
(45) Date of Patent: Jun. 23, 2020

(54) TOUCH SENSING STRUCTURE, TOUCH SUBSTRATE, MANUFACTURING METHOD THEREOF AND TOUCH DISPLAY DEVICE

(71) Applicant: BOE Technology Group Co., Ltd., Beijing (CN)

(72) Inventors: Xiaoliang Ding, Beijing (CN); Haisheng Wang, Beijing (CN); Yingming Liu, Beijing (CN); Yanling Han, Beijing (CN); Chihjen Cheng, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 79 days.

(21) Appl. No.: 16/303,473

(22) PCT Filed: Feb. 27, 2018

(86) PCT No.: PCT/CN2018/077392
§ 371 (c)(1),
(2) Date: Nov. 20, 2018

(87) PCT Pub. No.: WO2019/007084
PCT Pub. Date: Jan. 10, 2019

(30) Foreign Application Priority Data

Jul. 3, 2017 (CN) .......................... 2017 1 0533162

(51) Int. Cl.
*G06F 3/041* (2006.01)
*G06F 3/047* (2006.01)
(Continued)

(52) U.S. Cl.
CPC .......... *G06F 3/047* (2013.01); *G02F 1/13338* (2013.01); *G02F 1/133514* (2013.01); *G06F 3/0412* (2013.01); *G06F 2203/04103* (2013.01)

(58) Field of Classification Search
CPC ................ G06F 3/0412; G06F 3/0417; G06F 2203/04103; G02F 1/13338; G02F 1/133514
See application file for complete search history.

(56) References Cited

U.S. PATENT DOCUMENTS 8,749,498 B2    6/2014  Lim et al.
9,703,427 B2    7/2017  Zhao et al.
(Continued)

FOREIGN PATENT DOCUMENTS

CN    101930316 A    12/2010
CN    103034386 A    4/2013
(Continued)

OTHER PUBLICATIONS

English translation of International Search Report and Box V of Written Opinion for International Application No. PCT/CN2018/077392, dated May 24, 2018, 12 pages.

*Primary Examiner* — Ryan A Lubit
(74) *Attorney, Agent, or Firm* — Westman, Champlin & Koehler, P.A.

(57) ABSTRACT

The present disclosure provides a touch sensing structure, an operating method thereof, a touch substrate, a manufacturing method thereof, and a touch display device. The touch sensing structure includes: first signal lines; second signal lines; a plurality of sensing driving electrodes each connected to a corresponding first signal line and a corresponding second signal line; and a sensing layer in contact with the plurality of sensing driving electrodes. Rigidity of the sensing layer in contact with the sensing driving electrode changes along with a voltage difference between an electric signal applied to one of the first signal lines and an electric signal applied to the corresponding second signal line.

20 Claims, 2 Drawing Sheets

(51) Int. Cl.
*G02F 1/1333* (2006.01)
*G02F 1/1335* (2006.01)

(56) References Cited

U.S. PATENT DOCUMENTS

| | | |
|---|---|---|
| 2010/0321335 A1 | 12/2010 | Lim et al. |
| 2011/0084917 A1 | 4/2011 | Son et al. |
| 2014/0176491 A1 | 6/2014 | Zhao et al. |
| 2014/0320396 A1* | 10/2014 | Modarres ............... G06F 3/0414 |
| | | 345/156 |
| 2016/0098107 A1 | 4/2016 | Morrell et al. |
| 2016/0103496 A1 | 4/2016 | Degner et al. |
| 2017/0178470 A1* | 6/2017 | Khoshkava ......... H04M 1/0268 |
| 2017/0192582 A1* | 7/2017 | Pan ..................... G06F 3/0416 |
| 2017/0315622 A1 | 11/2017 | Morrell et al. |
| 2019/0163300 A1* | 5/2019 | Sun ........................ G06F 3/044 |

FOREIGN PATENT DOCUMENTS

| | | |
|---|---|---|
| CN | 205038595 U | 2/2016 |
| CN | 106652877 A | 5/2017 |
| CN | 107291296 A | 10/2017 |

\* cited by examiner

TOUCH SENSING STRUCTURE, TOUCH SUBSTRATE, MANUFACTURING METHOD THEREOF AND TOUCH DISPLAY DEVICE

CROSS-REFERENCE TO RELATED APPLICATION

The present application is a U.S. national phase of PCT Application No. PCT/CN2018/077392, filed on Feb. 27, 2018, which claims priority to Chinese patent application No. 201710533162.5 filed on Jul. 3, 2017, which are incorporated herein by reference in their entireties.

TECHNICAL FIELD

The present disclosure relates to the field of touch technology, in particular to a touch sensing structure, a touch substrate, a manufacturing method thereof and a touch display device.

BACKGROUND

Along with the development of the touch display technology, touch display devices have been widely applied to the production and daily life. The touch display device includes a touch panel, a display panel and a touch integrated circuit (IC) electrically connected to the touch panel and the display panel.

During the operation of the touch display device, a user touches the touch panel at a corresponding position in accordance with an action icon displayed on the display panel. However, the touch panel touched by the user has a flat surface, so the user may not touch the touch panel at a correct position, i.e., multiple attempts need to be taken by the user. Hence, the user experience is adversely affected, and it is difficult for the user with bad eyesight to use the touch panel.

SUMMARY

In one aspect, the present disclosure provides in some embodiments a touch sensing structure, including: first signal lines; second signal lines; a plurality of sensing driving electrodes each connected to a corresponding first signal line and a corresponding second signal line; and a sensing layer in contact with the plurality of sensing driving electrodes. Rigidity of the sensing layer changes along with a voltage difference between an electric signal applied to one of the first signal lines and an electric signal applied to a corresponding second signal line.

In a possible embodiment of the present disclosure, the sensing layer is made of a hydrogel material.

In a possible embodiment of the present disclosure, the sensing layer covers the plurality of sensing driving electrodes as a whole layer.

In a possible embodiment of the present disclosure, each sensing driving electrode is provided with a hollowed-out region.

In a possible embodiment of the present disclosure, each sensing driving electrode is directly connected to the sensing layer.

In a possible embodiment of the present disclosure, the sensing layer is made of a high-molecular hydrogel material whose rigidity changes along with a temperature.

In a possible embodiment of the present disclosure, the sensing layer is made of a high-molecular hydrogel material whose rigidity increases along with an increase in the temperature.

In another aspect, the present disclosure provides in some embodiments a method for operating the touch sensing structure, including controlling an electric signal applied to one of the first signal lines and an electric signal applied to the corresponding second signal line, to change rigidity of the sensing layer in contact with the sensing driving electrodes.

In a possible embodiment of the present disclosure, a voltage difference between the electric signal applied to one of the first signal lines and the electric signal applied to the corresponding second signal line is in positive correlation with rigidity of the sensing layer.

In yet another aspect, the present disclosure provides in some embodiments a touch substrate, including: a substrate; a plurality of touch electrodes arranged on the substrate; and a touch sensing structure arranged on the substrate. The touch sensing structure includes: first signal lines; second signal lines; a plurality of sensing driving electrodes each connected to a corresponding first signal line and a corresponding second signal line; and a sensing layer in contact with the plurality of sensing driving electrodes. Rigidity of the sensing layer changes along with a voltage difference between an electric signal applied to one of the first signal lines and an electric signal applied to a corresponding second signal line. Each sensing driving electrode is arranged adjacent to, and spaced apart from, a corresponding touch electrode.

In a possible embodiment of the present disclosure, each sensing driving electrode is provided with a hollowed-out region, and one of the touch electrodes is arranged at the hollowed-out region and spaced apart from the sensing driving electrode.

In a possible embodiment of the present disclosure, the sensing layer covers the touch sensing electrodes and the touch electrodes as a whole layer.

In a possible embodiment of the present disclosure, the sensing layer is made of a hydrogel material.

In a possible embodiment of the present disclosure, each sensing driving electrode is directly connected to the sensing layer.

In a possible embodiment of the present disclosure, the touch electrodes and the sensing driving electrodes are arranged at a same layer and made of a same material.

In a possible embodiment of the present disclosure, the plurality of sensing driving electrodes and the plurality of touch electrodes are arranged on the substrate in an array form, each sensing driving electrode is provided with at least one hollowed-out region, and one of the touch electrodes is arranged at each hollowed-out region.

In a possible embodiment of the present disclosure, each sensing driving electrode is provided with a plurality of hollowed-out regions, and one of the touch electrodes is arranged at each hollowed-out region.

In a possible embodiment of the present disclosure, the touch substrate further includes an elastic protection layer covering the touch sensing structure.

In still yet another aspect, the present disclosure provides in some embodiments a touch display device including the above-mentioned touch substrate.

In a possible embodiment of the present disclosure, the touch display device further includes a display panel laminated on the touch substrate. The display substrate includes an array substrate and a color filter substrate arranged opposite to each other to form a cell, a base substrate is shared by the color filter substrate and the touch substrate, and the touch sensing structure is arranged at a surface of the color filter substrate away from the array substrate.

In still yet another aspect, the present disclosure provides in some embodiments a method for manufacturing a touch substrate, including: forming first signal lines and second signal lines; forming a plurality of sensing driving electrodes each connected to a corresponding first signal line and a corresponding second signal line; and forming a sensing layer in contact with the plurality of sensing driving electrodes.

In a possible embodiment of the present disclosure, the method further includes forming a plurality of touch electrodes. The forming the plurality of touch electrodes includes forming the plurality of touch electrodes and the plurality of sensing driving electrodes through a single patterning process.

DETAILED DESCRIPTION OF THE EMBODIMENTS

Figure 1:
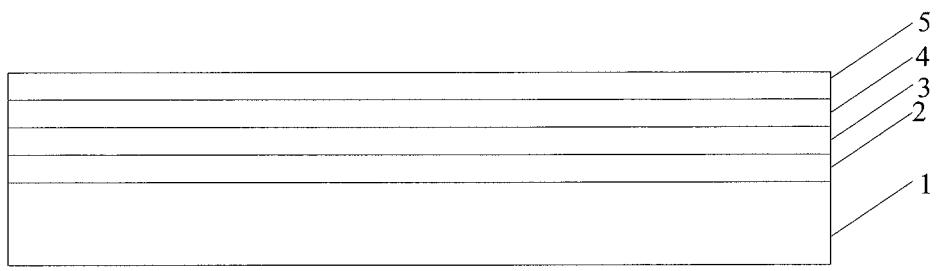
FIG. 1 is a schematic view showing a touch substrate according to one embodiment of the present disclosure.

The present disclosure will be described hereinafter in conjunction with the drawings and embodiments. The following embodiments are for illustrative purposes only, but shall not be used to limit the scope of the present disclosure.

In the related art, a touch panel touched by a user has a flat surface, so the user may not touch the touch panel at a correct position, i.e., multiple attempts need to be taken by the user. Hence, the user experience is adversely affected, and it is difficult for the user with bad eyesight to use the touch panel. An object of the present disclosure is to provide a touch sensing structure, an operating method thereof, a touch substrate, a manufacturing method thereof and a touch display device, so as to achieve touch navigation and enable the user to acquire a position of an action icon accurately, thereby to improve the user experience.

The present disclosure provides in some embodiments a touch sensing structure, which includes: first signal lines; second signal lines; a plurality of sensing driving electrodes each connected to the corresponding first signal line and the corresponding second signal line; and a sensing layer in contact with the plurality of sensing driving electrodes. Rigidity of the sensing layer is capable of changing along with a voltage difference between an electric signal applied to one of the first signal lines and an electric signal applied to the corresponding second signal line.

According to the embodiments of the present disclosure, when there is the voltage difference between the electric signal applied to the first signal line and the electric signal applied to the second signal line, a current may be generated in each sensing driving electrode, so as to heat the sensing layer in contact with the sensing driving electrode, thereby to change the rigidity of the sensing layer. When a touch display device is operated by a user, it is able to change the rigidity of a portion of the sensing layer corresponding to an action icon through controlling the electric signals applied to the first signal line and the second signal line, thereby to enable the user to determine a position of the action icon accurately and achieve the touch navigation through finger's feeling. In addition, it is able for the user with bad eyesight to use the touch display device.

In a possible embodiment of the present disclosure, the voltage difference between the electric signal applied to the first signal line and the electric signal applied to the second signal line is in positive correlation with the rigidity of the sensing layer, i.e., the larger the voltage difference is, the larger the rigidity of the sensing layer is. In this way, it is able to control the rigidity of the sensing layer through controlling the electric signals applied to the first signal line and the second signal line.

In a possible embodiment of the present disclosure, the sensing layer may be made of a hydrogel material, e.g., a high-molecular hydrogel material. The hydrogel material has relatively low rigidity in the case of not being energized, and relatively high rigidity in the case of being energized. The energization of the hydrogel may be achieved through heating. Of course, the sensing layer may also be made of any other material, as long as its rigidity changes after being heated.

The present disclosure further provides in some embodiments an operating method for use in the above-mentioned touch sensing structure, including controlling an electric signal applied to one of the first signal lines and an electric signal applied to the corresponding second signal line, so as to change rigidity of the sensing layer in contact with the sensing driving electrodes.

In a possible embodiment of the present disclosure, a voltage difference between the electric signal applied to the first signal line and the electric signal applied to the second signal line is in positive correlation with the rigidity of the sensing layer, i.e., the larger the voltage difference is, the larger the rigidity of the sensing layer is.

The present disclosure further provides in some embodiments a touch substrate including a plurality of touch electrodes arranged on a substrate and the above-mentioned touch sensing structure arranged on a substrate.

According to the touch substrate in the embodiments of the present disclosure, when there is the voltage difference between the electric signal applied to the first signal line and the electric signal applied to the second signal line, a current may be generated in each sensing driving electrode, so as to heat the sensing layer in contact with the sensing driving electrode, thereby to change the rigidity of the sensing layer. When a touch display device is operated by a user, it is able to change the rigidity of a portion of the sensing layer corresponding to an action icon through controlling the electric signals applied to the first signal line and the second signal line, thereby to enable the user to determine a position of the action icon accurately and achieve the touch navigation through finger's feeling. In addition, it is able for the user with bad eyesight to use the touch display device.

In a possible embodiment of the present disclosure, the touch electrodes are created from a same layer as the sensing driving electrodes. In this way, the touch electrodes and the sensing driving electrodes may be formed through a single patterning process, so as to reduce the quantity of the patterning processes for manufacturing the touch substrate and reduce the manufacture cost thereof.

In a possible embodiment of the present disclosure, the plurality of sensing driving electrodes and the plurality of touch electrodes may be arranged on the substrate in an array form. Each sensing driving electrode may be provided with a hollowed-out region, and one of the touch electrodes may be arranged at the hollowed-out region. In this way, the sensing driving electrodes and the touch electrodes may be arranged alternately and uniformly on the substrate.

In a possible embodiment of the present disclosure, the touch substrate further includes an elastic protection layer covering the touch sensing structure. In order to enable the user to acquire the change in the rigidity of the sensing layer, the elastic protection layer in contact with a user's finger and covering the touch sensing structure must be made of an elastic material.

The present disclosure further provides in some embodiments a touch display device including the above-mentioned touch substrate. The touch display device may be any product or member having a display function, e.g., television, display, digital photo frame, mobile phone or flat-panel computer. The touch display device further includes a flexible circuit board, a printed circuit board and a back plate. When the touch display device is operated by the user, it is able to change the rigidity of a portion of the sensing layer corresponding to an action icon through controlling the electric signals applied to the first signal line and the second signal line, thereby to enable the user to determine a position of the action icon accurately and achieve the touch navigation through finger's feeling. In addition, it is able for the user with bad eyesight to use the touch display device.

As shown in FIG. 1, the touch substrate includes a signal line layer 2, a layer of the sensing driving electrodes and the touch electrodes 3, the sensing layer 4, and the elastic protection layer 5 that are arranged on a base substrate 1. The signal line layer 2 includes the first signal lines and the second signal lines. Each of the first signal lines and the second signal lines is made of a metal material having relatively low resistivity. The first signal lines and the second signal lines may be arranged at a same layer or different layers. The sensing driving electrodes and the touch electrodes may be arranged at a same layer, so they may be formed through a single patterning process. The sensing layer 4 may be made of a hydrogel material. In the case of not being energized, the hydrogel material is in a transparent state and has relatively low rigidity, while in the case of being energized, the hydrogel material has relatively high rigidity. The energization of the hydrogel material may be achieved through heating. The sensing layer 4 may cover the sensing driving electrodes and the touch electrodes as a whole layer. The elastic protection layer 5 may be made of an elastic material, e.g., polyurethane.

Figure 2:
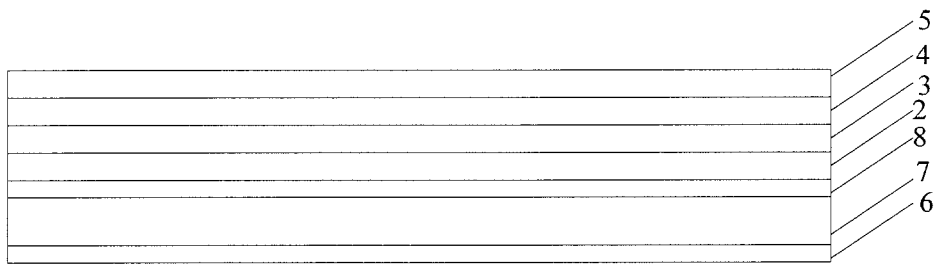
FIG. 2 is a schematic view showing a touch display device according to one embodiment of the present disclosure.

The touch substrate may be assembled with a display panel so as to form the touch display device. As shown in FIG. 2, the touch display device includes the touch substrate and a liquid crystal display panel. The liquid crystal display panel includes an array substrate 6, a color filter substrate 8 and a liquid crystal layer 7 arranged between the array substrate 6 and the color filter substrate 8. The touch substrate includes the signal line layer 2, the layer of the sensing driving electrodes and the touch electrodes 3, the sensing layer 4 and the elastic protection layer 5. A same base substrate may be shared by the touch substrate and the color filter substrate 8, i.e., the signal line layer 2 may be formed at a surface of the color filter substrate 8 away from the array substrate 6, so as to reduce a thickness of the touch display device. Of course, apart from the liquid crystal display panel, the touch substrate may also be assembled with any other display panel, e.g., an organic light-emitting diode (OLED) display panel, so as to form the touch display device.

Figure 3:
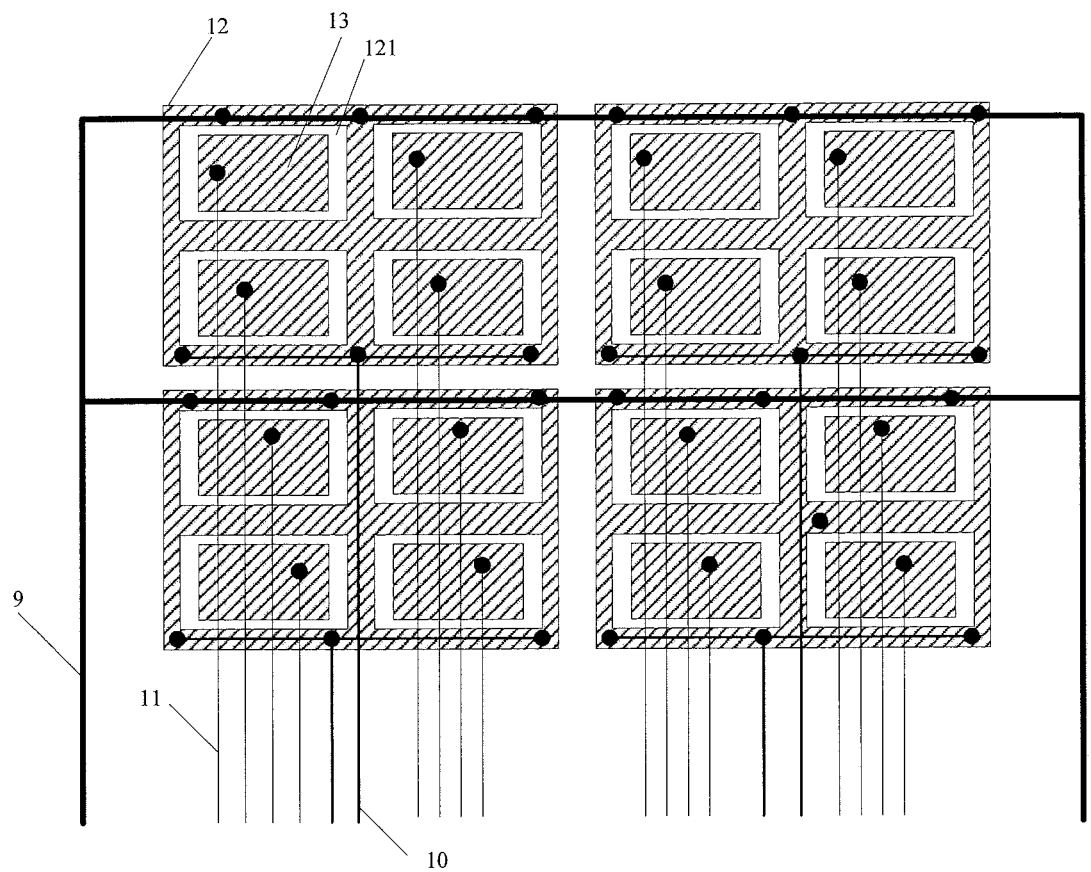
FIG. 3 is a planar view of a touch substrate according to one embodiment of the present disclosure.

As shown in FIG. 3, in the touch substrate, the plurality of touch sensing electrodes 12 is arranged on the base substrate in an array form, and each sensing driving electrode 12 may be of an approximately rectangular shape. Each sensing driving electrode 12 may be provided with a hollowed-out region 121, and the touch electrodes 13 may be arranged at the hollowed-out region. Each touch electrode 13 may be connected to a touch circuit through a corresponding touch signal line for touch detection. Each sensing driving electrode 12 may be connected to the corresponding first signal line 9 and the corresponding second signal line 10. The first signal lines 9 may be created from a same metal layer as the touch signal lines 11, and the second signal lines 10 may be created from another metal layer. Because each sensing driving electrode 12 is connected to the corresponding first signal line 9 and the corresponding second signal line 10, the current may be generated in each sensing driving electrode through applying an electric signal to the sensing driving electrode individually, so as to heat a corresponding portion of the sensing layer 4.

During the operation of the touch display device, the electric signals may be applied to the first signal line 9 and the second signal line 10. When there is the voltage difference between the electric signal applied to the first signal line 9 and the electric signal applied to the second signal line 10, a current may be generated in each sensing driving electrode 12, so as to heat the sensing layer 4 in contact with the sensing driving electrode 12, thereby to change the rigidity of the sensing layer 4. When the touch display device is operated by the user, it is able to change the rigidity of a portion of the sensing layer 4 corresponding to the action icon through controlling the electric signals applied to the first signal line 9 and the second signal line 10, thereby to enable the user to determine a position of the action icon accurately and achieve the touch navigation through finger's feeling. In addition, it is able for the user with bad eyesight to use the touch display device.

The present disclosure further provides in some embodiments a method for manufacturing a touch substrate, including: forming first signal lines and second signal lines; forming a plurality of sensing driving electrodes each connected to the corresponding first signal line and the corresponding second signal line; and forming a sensing layer in contact with the plurality of sensing driving electrodes.

According to the manufacturing method in the embodiments of the present disclosure, when there is a voltage difference between an electric signal applied to the first signal line and an electric signal applied to the second signal line, a current may be generated in each sensing driving electrode, so as to heat the sensing layer in contact with the sensing driving electrode, thereby to change rigidity of the sensing layer. When a touch display device is operated by a user, it is able to change the rigidity of a portion of the sensing layer corresponding to an action icon through controlling the electric signals applied to the first signal line and the second signal line, thereby to enable the user to determine a position of the action icon accurately and achieve the touch navigation through finger's feeling. In addition, it is able for the user with bad eyesight to use the touch display device.

In a possible embodiment of the present disclosure, the method further includes forming a plurality of touch electrodes. The forming the plurality of touch electrodes includes forming the plurality of touch electrodes and the plurality of sensing driving electrodes through a single patterning process. When the plurality of touch electrodes and the plurality of sensing driving electrodes are formed through a single patterning process, it is able to reduce the quantity of patterning processes for manufacturing the touch substrate, thereby to reduce the manufacture cost thereof.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "include" or "including" intends to indicate that an element or object before the word contains an element or object or equivalents thereof listed after the word, without excluding any other element or object. Such words as "connect/connected to" or "couple/coupled to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

It should be appreciated that, in the case that such an element as layer, film, region or substrate is arranged "on" or "under" another element, it may be directly arranged "on" or "under" the other element, or an intermediate element may be arranged therebetween.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A touch sensing structure, comprising:
   first signal lines that each transmit a first electric signal;
   second signal lines that each transmit a second electric signal;
   a plurality of sensing driving electrodes each connected to a corresponding first signal line and a corresponding second signal line, where each of the plurality of sensing driving electrodes receives the first electric signal and the second electric signal; and
   a sensing layer in contact with the plurality of sensing driving electrodes,
   wherein rigidity of the sensing layer is changed based on a voltage difference between the first electric signal applied to one of the first signal lines and the second electric signal applied to a corresponding second signal line.

2. The touch sensing structure according to claim 1, wherein the sensing layer is made of a hydrogel material.

3. The touch sensing structure according to claim 1, wherein the sensing layer covers the plurality of sensing driving electrodes as a whole layer.

4. The touch sensing structure according to claim 1, wherein each sensing driving electrode is provided with a hollowed-out region.

5. The touch sensing structure according to claim 1, wherein each sensing driving electrode is directly connected to the sensing layer.

6. The touch sensing structure according to claim 5, wherein the sensing layer is made of a high-molecular hydrogel material whose rigidity changes along with a temperature.

7. The touch sensing structure according to claim 5, wherein the sensing layer is made of a high-molecular hydrogel material whose rigidity increases along with an increase in a temperature.

8. A touch substrate, comprising:
   a substrate;
   a plurality of touch electrodes arranged on the substrate; and
   a touch sensing structure arranged on the substrate,
   wherein the touch sensing structure comprises:
      first signal lines that each transmit a first electric signal;
      second signal lines that each transmit a second electric signal;
      a plurality of sensing driving electrodes each connected to a corresponding first signal line and a corresponding second signal line, where each of the plurality of sensing driving electrodes receives the first electric signal and the second electric signal; and
      a sensing layer in contact with the plurality of sensing driving electrodes,
   wherein rigidity of the sensing layer is changed based on a voltage difference between the first electric signal applied to one of the first signal lines and the second electric signal applied to the corresponding second signal line, and each sensing driving electrode is arranged adjacent to, and spaced apart from, a corresponding touch electrode.

9. The touch substrate according to claim 8, wherein each sensing driving electrode is provided with a hollowed-out region, and one of the touch electrodes is arranged at the hollowed-out region and spaced apart from the sensing driving electrode.

10. The touch substrate according to claim 9, wherein the sensing layer covers the touch sensing electrodes and the touch electrodes as a whole layer.

11. The touch substrate according to claim 10, wherein the sensing layer is made of a hydrogel material.

12. The touch substrate according to claim 9, wherein each sensing driving electrode is directly connected to the sensing layer.

13. The touch substrate according to claim 9, wherein the touch electrodes and the sensing driving electrodes are arranged at a same layer and made of a same material.

14. The touch substrate according to claim 9, wherein the plurality of sensing driving electrodes and the plurality of touch electrodes are arranged on the substrate in an array form, each sensing driving electrode is provided with at least one hollowed-out region, and one of the touch electrodes is arranged at each hollowed-out region.

15. The touch substrate according to claim 14, wherein each sensing driving electrode is provided with a plurality of hollowed-out regions, and one of the touch electrodes is arranged at each hollowed-out region.

16. The touch substrate according to claim 9, further comprising an elastic protection layer covering the touch sensing structure.

17. A touch display device comprising the touch substrate according to claim 8.

18. The touch display device according to claim 17, further comprising a display panel laminated on the touch substrate, wherein the display panel comprises an array substrate and a color filter substrate arranged opposite to each other to form a cell, a base substrate is shared by the color filter substrate and the touch substrate, and the touch sensing structure is arranged at a surface of the color filter substrate away from the array substrate.

19. A method for manufacturing a touch substrate, wherein the touch sensing structure includes: first signal lines that each transmit a first electric signal; second signal lines that each transmit a second electric signal; a plurality of sensing driving electrodes each connected to a corresponding first signal line and a corresponding second signal line, where each of the plurality of sensing driving electrodes receives the first electric signal and the second electric signal; and a sensing layer in contact with the plurality of sensing driving electrodes, wherein rigidity of the sensing layer is changed based on a voltage difference between the first electric signal applied to one of the first signal lines and the second electric signal applied to a corresponding second signal line, wherein the method comprises:

forming the first signals and the second signal lines;

forming the plurality of sensing driving electrodes each connected to the corresponding first signal line and the corresponding second signal line; and forming the sensing layer in contact with the plurality of sensing driving electrodes.

20. The method according to claim 19, further comprising forming a plurality of touch electrodes, wherein the forming the plurality of touch electrodes comprises forming the plurality of touch electrodes and the plurality of sensing driving electrodes through a single patterning process.

\* \* \* \* \*